US011879081B2

(12) United States Patent
Schönfelder et al.

(10) Patent No.: US 11,879,081 B2
(45) Date of Patent: Jan. 23, 2024

(54) RELEASE LINER FOR REPOSITIONABLE ADHESIVE ARTICLES

(71) Applicant: Mondi AG, Vienna (AT)

(72) Inventors: Helmut Schönfelder, Thansau (DE); Rolf Krekel, Raubling (DE); Wilhelm Munninger, Neubeuern (DE)

(73) Assignee: Mondi AG, Vienna (AT)

( * ) Notice: Subject to any disclaimer, the term of this patent is extended or adjusted under 35 U.S.C. 154(b) by 219 days.

(21) Appl. No.: 17/125,894

(22) Filed: Dec. 17, 2020

(65) Prior Publication Data
US 2021/0189194 A1    Jun. 24, 2021

(30) Foreign Application Priority Data

Dec. 20, 2019  (EP) .................................... 19218586

(51) Int. Cl.
*C09J 7/40*     (2018.01)
*B32B 27/32*    (2006.01)
(Continued)

(52) U.S. Cl.
CPC ................ *C09J 7/405* (2018.01); *B32B 3/30* (2013.01); *B32B 27/10* (2013.01); *B32B 27/32* (2013.01);
(Continued)

(58) Field of Classification Search
CPC ....... C09J 7/405; C09J 5/00; C09J 7/29; C09J 7/385; C09J 7/401; C09J 7/403;
(Continued)

(56) References Cited

U.S. PATENT DOCUMENTS 3,565,750 A * 2/1971 Evans ........................ C09J 7/22
                                                        428/447
4,812,541 A    3/1989 Mallya et al.
(Continued)

FOREIGN PATENT DOCUMENTS

DE      69030993 T2    1/1998
DE      69317890 T2    9/1998
(Continued)

OTHER PUBLICATIONS

[NPL-1] "Technical Data Sheet: Advantage MG White High Gloss"; Mondi (2019); <https://irp-cdn.multiscreensite.com/067f2458/files/uploaded/Scheda%20Tecnica%20KBSSR3-35-43%20-%20inglese.pdf>. (Year: 2019).*
(Continued)

*Primary Examiner* — David Sample
*Assistant Examiner* — Donald M Flores, Jr.
(74) *Attorney, Agent, or Firm* — Wolf, Greenfield & Sacks, P.C.

(57) ABSTRACT

The present invention inter alia relates to a release liner, which comprises according to an embodiment, a carrier substrate, a thermoplastic polymer layer applied on one side of the carrier substrate, and a release layer applied on the thermoplastic polymer layer on the side opposite to the carrier substrate. The thermoplastic polymer layer and the release layer include a network of ridges resulting in elevations of the surface of the release liner. The surface on the release layer side has a roughness at least between the ridges, such that it has a plurality of pits. The average number of pits per an area of 3.4 mm$^2$ of the plan view of the release liner surface is at least 50. The pits extend at least to a level of 10.0 μm above the deepest point of the deepest pit within said area.

21 Claims, 5 Drawing Sheets

(51) Int. Cl.
| | |
|---|---|
| *B32B 38/00* | (2006.01) |
| *B32B 38/06* | (2006.01) |
| *B32B 37/15* | (2006.01) |
| *B32B 3/30* | (2006.01) |
| *C09J 7/29* | (2018.01) |
| *C09J 7/38* | (2018.01) |
| *C09J 5/00* | (2006.01) |
| *B32B 27/10* | (2006.01) |

(52) U.S. Cl.
CPC ........ *B32B 37/153* (2013.01); *B32B 38/0012* (2013.01); *B32B 38/06* (2013.01); *C09J 5/00* (2013.01); *C09J 7/29* (2018.01); *C09J 7/385* (2018.01); *C09J 7/401* (2018.01); *C09J 7/403* (2018.01); *B32B 2255/10* (2013.01); *B32B 2255/26* (2013.01); *B32B 2405/00* (2013.01); *B32B 2451/00* (2013.01); *C09J 2301/122* (2020.08); *C09J 2301/302* (2020.08); *C09J 2423/045* (2013.01); *C09J 2423/105* (2013.01); *C09J 2427/006* (2013.01); *C09J 2433/00* (2013.01); *C09J 2483/005* (2013.01)

(58) Field of Classification Search
CPC ............ C09J 2301/122; C09J 2301/302; C09J 2423/045; C09J 2423/105; C09J 2427/006; C09J 2433/00; C09J 2483/005; B32B 3/30; B32B 27/32
See application file for complete search history.

(56) References Cited

U.S. PATENT DOCUMENTS

| | | | |
|---|---|---|---|
| 4,968,562 | A | 11/1990 | Delgado |
| 4,994,322 | A | 2/1991 | Delgado et al. |
| 5,141,790 | A | 8/1992 | Calhoun et al. |
| 5,296,277 | A | 3/1994 | Wilson et al. |
| 5,362,516 | A | 11/1994 | Wilson et al. |
| 5,589,246 | A | 12/1996 | Calhoun et al. |
| 5,897,930 | A * | 4/1999 | Calhoun .................... C09J 7/22 428/156 |
| 6,299,945 | B1 * | 10/2001 | Mertz ................... C09D 183/06 427/559 |
| 6,759,110 | B1 | 7/2004 | Fleming et al. |
| 7,087,279 | B2 | 8/2006 | Callahan et al. |
| 7,250,210 | B2 | 7/2007 | Mazurek et al. |
| 7,332,206 | B2 | 2/2008 | Callahan et al. |
| 8,334,038 | B2 | 12/2012 | Wozniak et al. |
| 9,240,131 | B2 | 1/2016 | Onderisin et al. |
| 9,353,294 | B2 | 5/2016 | Fleming et al. |
| 2003/0178124 | A1 | 9/2003 | Mikami et al. |
| 2006/0188704 | A1 | 8/2006 | Mikami et al. |
| 2011/0111157 | A1 | 5/2011 | Onderisin et al. |
| 2013/0068367 | A1 | 3/2013 | Mikami et al. |
| 2017/0260425 | A1 | 9/2017 | Yamamoto et al. |

FOREIGN PATENT DOCUMENTS

| | | |
|---|---|---|
| DE | 69619849 T2 | 11/2002 |
| DE | 202004001802 U1 | 5/2004 |
| DE | 60121158 T2 | 6/2007 |
| DE | 69715250 T3 | 7/2010 |
| EP | 0257984 B1 | 5/1992 |
| EP | 0570515 B1 | 6/1996 |
| EP | 0617708 B1 | 9/1996 |
| EP | 0647256 B1 | 4/1998 |
| EP | 0710678 B1 | 7/1998 |
| EP | 0597883 B1 | 12/1998 |
| EP | 0725809 B1 | 12/1999 |
| EP | 0861307 B1 | 3/2002 |
| EP | 0951518 B2 | 9/2002 |
| EP | 1023419 B1 | 4/2003 |
| EP | 1114713 B1 | 2/2005 |
| EP | 1180127 B1 | 2/2006 |
| EP | 1276605 B1 | 3/2006 |
| EP | 1309663 B1 | 6/2006 |
| EP | 1711571 B1 | 7/2008 |
| EP | 1818160 B1 | 8/2008 |
| EP | 1373424 B1 | 6/2009 |
| EP | 2072595 A1 | 6/2009 |
| EP | 1799787 B1 | 1/2011 |
| EP | 1920020 B1 | 1/2011 |
| EP | 1685206 B1 | 9/2012 |
| EP | 2285924 B1 | 6/2014 |
| EP | 2393896 B1 | 2/2016 |
| WO | WO 93/02855 A1 | 2/1993 |
| WO | WO 97/18276 A1 | 5/1997 |
| WO | WO 98/29516 A1 | 7/1998 |
| WO | WO 00/31201 A2 | 6/2000 |
| WO | WO 01/81013 A1 | 11/2001 |
| WO | WO 2006/076116 A1 | 7/2006 |
| WO | WO 2007/062016 A1 | 5/2007 |

OTHER PUBLICATIONS 19218586.6, Jun. 23, 2020, Extended European Search Report.
Extended European Search Report dated Jun. 23, 2020 in connection with EP Application No. 19218586.6.
International Organization for Standardization, DIN EN ISO 4287:2010-07 with English translation, Jul. 2010, 58 pages.
International Organization for Standardization, DIN EN ISO 25178-2:2012-09 with English translation, Sep. 2012, 126 pages.
[No Author Listed] Loop Tack Measurement. In: FINAT Technical Handbook, $9^{th}$ edition, 2014:22-23.
Satas et al., Acrylic Adhesives. In: Handbook of Pressure Sensitive Adhesive Technology, $2^{nd}$ ed. 1989. Van Nostrand Reinhold. Chapter 15:396-456.

* cited by examiner

RELEASE LINER FOR REPOSITIONABLE ADHESIVE ARTICLES

CROSS REFERENCE TO RELATED APPLICATION

The present application claims priority to European Application No. 19 218 586.6, filed Dec. 20, 2019. The aforementioned application is hereby incorporated by reference herein.

TECHNICAL FIELD

The present invention relates to a release liner, an adhesive article comprising the same, a process for producing the release liner, and a process for decorating an object using the adhesive article.

TECHNICAL BACKGROUND

For decorating objects such as vehicles like cars, trucks, busses or airplanes, self-adhesive films or decals having images printed thereon are used. Such self-adhesive articles are typically stored using release liners for protection of the pressure-sensitive adhesive. The release liners may also serve as process liners during their manufacture.

The release liners may have a structure such as ridges on their surface, which form a complementary structure like channels in the surface of the pressure-sensitive adhesive of the self-adhesive article. Upon removal of the release liner, the adhesive is exposed, and the self-adhesive article can be applied onto an object. The channels formed in the adhesive may serve as egress channels, so that air is not entrapped under the article or film, respectively, but can be pressed out through said channels.

Large decorations, for example fleet graphics, are typically composed of several films, since it is difficult to produce and apply large self-adhesive films. In order to obtain a good aesthetic impression, it is required to apply the self-adhesive films very accurately, in particular, when a motif is spread over several films. In such cases, repositionable self-adhesive films are desirable in order to allow for correcting their position and adjusting the self-adhesive films on the surface of the object.

Several attempts of the prior art for the provision of repositionable adhesive articles aimed at creating non-adhesive areas on the adhesive material of an adhesive-backed article, for example by printing or sprinkling a non-adhesive material onto the adhesive. Such non-adhesive materials can however have a negative impact on the final adhesion of the adhesive articles and, thus, reduce their performance. In addition, an additional step for applying the non-adhesive material is required.

A further attempt for providing release liners for repositionable self-adhesive articles was made in EP 0 951 518 B1. A release liner was produced by a method comprising a first embossing step of forming small recesses into the release surface of the release liner, filling the recesses with fine glass beads, and a second embossing step for forming a pattern of ridges on the surface. A pressure-sensitive adhesive and a film are subsequently applied to form the adhesive article. The ridges of the release liner produce a pattern of channels in the adhesive material; and the glass-filled recesses of the release liner surface result in glass-filled pegs protruding from the surface of the adhesive article. The manufacture of the adhesive article is thus quite complex, as it requires two separate embossing steps and a step for accurately applying the glass beads in the recesses. Furthermore, the glass beads typically reduce the final adhesion between adhesive article and object, because the adhesive surface is partially covered with glass beads.

In addition to the above, in order to achieve a good aesthetic impression without visibility of a regular structure of the decorated object, it is desirable that structures or patterns formed in the adhesive material of an adhesive-backed film cannot be seen through the article such as a film.

In conventional release liners, the ridges usually have a geometrically well-defined regular cross-sectional shape, such as a rectangular, a trapeze, a trapezoid cross-sectional shape, or an inverse V or U cross-sectional shape. The edges and the flat side-walls of such ridges can however cause an unfavorable aesthetic impression of the adhesive article, as the corresponding channels might be seen through the adhesive article.

In view of the above, there is an ongoing need for providing release liners for repositionable adhesive articles.

SUMMARY OF THE INVENTION

Therefore, it is an object of the present invention to provide a release liner for repositionable adhesive articles. In particular, the release liner shall reduce or overcome one or more of the above described problems associated with repositionable release liners of the prior art. The release liner shall be easy to produce and result in an adhesive article with good final adhesion to the surface of an object. Further objects of the present invention are the provision of an adhesive article comprising the release liner, a process for producing the release liner and a process for producing an object decorated with the article.

The above objects are solved by the release liner, the adhesive article and the processes according to the independent claims. Preferred embodiments are described herein below and in the dependent claims.

Figure 1A:
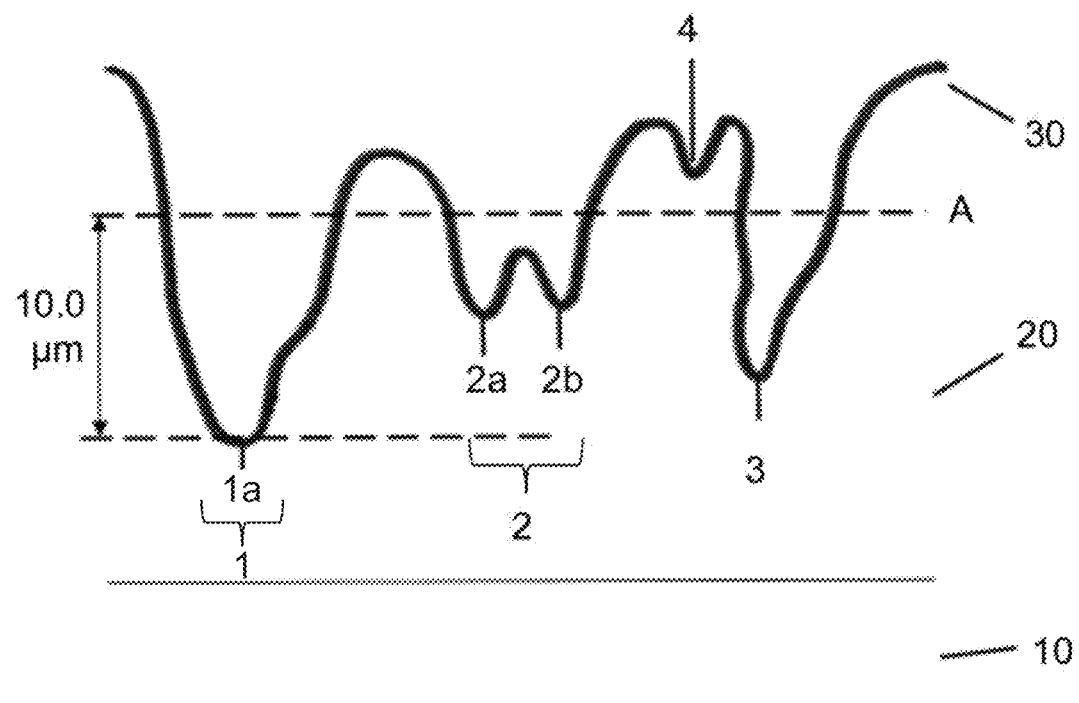
FIG. 1a shows a schematic cross-sectional view of a small section of a release liner according to an embodiment of the present invention.

DETAILED DESCRIPTION OF THE INVENTION (1) According to a first aspect of the present invention, a release liner is provided. The release liner comprises:
- a carrier substrate;
- a thermoplastic polymer layer applied on one side of the carrier substrate; and
- a release layer applied on the thermoplastic polymer layer on the side opposite to the carrier substrate;
- wherein the thermoplastic polymer layer and the release layer include a network of ridges which result in elevations of the surface of the release liner on the side of the release layer;
- wherein the surface on the side of the release layer has a roughness at least between the ridges, such that it has a plurality of pits, and
- wherein the average number of pits per an area of 3.4 mm$^2$ of the plan view of the release liner surface is at least 50 as determined with a confocal 3D laser scanning microscope at a magnification of 100, wherein only pits are counted, which extend at least to a level of 10.0 µm above the deepest point of the deepest pit within said area of 3.4 mm$^2$, and with the proviso that pits having a joint cross-sectional area in the plan view of the release liner surface at the level of 10.0 µm above the deepest point of the deepest pit are counted as a single pit.

In the release liner, the release layer forms an outermost layer of the release liner. The "surface of the release liner on the side of the release layer" is also simply referred to as "surface of the release liner" or "release surface" herein. The release layer is typically thin and comprised of a release material having low adhesion to a pressure-sensitive adhesive, so that the release liner can be easily removed from an adhesive article without damaging the article or the adhesive layer applied thereon.

The ridges protrude from the release liner and form elevations of the surface of the release liner. The ridges are formed by portions of the thermoplastic layer and the release layer. The ridges are typically continuous ridges. Preferably, the network of ridges extends over the entire surface of the release liner on the side of the release layer.

The release liner can be used for protecting and structuring an adhesive layer of pressure-sensitive adhesive of an adhesive article. The surface structure of the release liner is typically transferred into the pressure-sensitive adhesive resulting in a surface structure of the adhesive layer, which is substantially complementary to the surface structure of the release liner. Accordingly, the network of ridges of the release liner forms a network of channels in the pressure-sensitive adhesive of the adhesive layer. In the adhesive article, the channels usually extend to at least one edge of the adhesive layer, and, preferably, the network of channels extends over the entire surface of the adhesive layer.

The network of channels in the adhesive layer is capable of serving as egress channels for air and, if applicable, other fluids. As a consequence, after removal of the release liner, the adhesive article can be applied onto an object without entrapping air bubbles, because air can be released through the channels in the adhesive material without damaging the adhesive article. Hence, the network of ridges of the release liner is configured to form a network of channels in a pressure-sensitive adhesive of the adhesive layer of an adhesive article, the network of channels serving as air egress channels when applying the adhesive article onto the surface of an object.

In contrast to conventional release liners, the surface of the release liner between the ridges surface is not flat or smooth. On the contrary, the release liner of the present invention has a special surface structure, because the surface of the release liner has a roughness, that is, it is roughened, at least between the ridges, such that it has a plurality of pits. "Between the ridges" refers to the areas of the surface of the release liner, which are surrounded by ridges.

The pits and the number thereof are determined using a confocal 3D laser scanning microscope at a magnification of 100. The procedure is described in more detail below. The plan view of the surface of the release liner corresponds to the projected area observed with the microscope. The deepest point of the deepest pit could be considered the global minimum of the surface of the release liner within the observed area of 3.4 mm$^2$. The other pits form local minima of the surface of the release liner.

As outlined above, when used in an adhesive article, the structure of the surface of the release liner is transferred into the adhesive layer of pressure-sensitive adhesive and forms a substantially complementary surface structure therein. Hence, in addition to the network of channels derived from the ridges, the surface of the adhesive layer is roughened at least between the channels and contains a plurality of peaks derived from the pits in the surface of the release liner. Thus, the adhesive layer of the adhesive article has a plurality of peaks composed of the adhesive material.

The present inventors have surprisingly found that the release liner can be used for making a repositionable adhesive article showing excellent slidability.

Without being bound to theory, the inventors assume that the peaks of pressure-sensitive adhesive form contact points of the adhesive layer, which are available for initially adhering the adhesive article to the surface of an object. Thus, (if not pressed too hard) only a small portion of the adhesive layer forms the initial contact, which results in comparatively weak adhesion of the adhesive article. At this stage, the adhesive article can be easily detached from the surface of the object and reapplied. Furthermore, the adhesive article can even be repositioned by shifting or sliding the article on the surface of the object without deforming or otherwise damaging the adhesive article. In consequence, the position of the adhesive article can be easily corrected, so that it can be (re-) positioned very accurately.

The inventors further assume that the excellent slidability of the adhesive article can be attributed to the peaks of the adhesive layer, which are derived from the pits in the surface of the release liner. Without being bound to theory, it is assumed that, for sliding the adhesive article on the surface of an object, only the adhesive force at the peaks of pressure-sensitive adhesive, that is, at the contact points has to be overcome, so that the mechanical stress caused to the adhesive article as such is small.

In contrast to that, in conventional adhesive articles having a flat and smooth surface between the channels, the entire areas between the channels form the initial contact area to the surface of an object, to which the article is applied. Hence, due to the large contact areas, more energy is required for repositioning or sliding the adhesive article, which causes more mechanical stress and damage to the adhesive article as if the release liner of the present invention were used for forming the surface structure of the adhesive layer.

Usually, the special surface structure of the release liner of the present invention allows for good repositionability and slidability of the adhesive article for the usual time needed for applying a self-adhesive article to the surface of an object such as several minutes. The more an adhesive article is pressed against the surface of an object it is applied to, the more repositionability and slidability are reduced. The pressure is typically applied by hand or with manual tools. The adhesion is further enhanced the longer the adhesive article remains at the same position, which is assumed to be caused by the so-called "cold flow" of the adhesive material, which intensifies adhesion of the article to the surface of the object, because with time the adhesive adheres more and more intimate to the surface of the object. Usually, when using common pressure-sensitive adhesives and manual tools to apply pressure, a good adhesion of the adhesive article to the object is obtained after 24 hours.

In conventional repositionable adhesive articles, which rely on non-adhesive materials such as glass beads, inorganic, or polymeric particles for reducing the initial adhesion, the final adhesion to an object may be impaired, because the non-adhesive material remains between the object and the adhesive article. Since the adhesive article using the release liner of the present invention does not require non-adhesive materials for imparting repositionability and slidability to an adhesive article, the final adhesion of the adhesive article can be improved in comparison to such conventional repositionable adhesive articles.

Thus, in contrast to conventional release liners, which apply non-adhesive materials such as glass beads, inorganic, or polymeric particles onto the adhesive layer of an adhesive article, the release liner of the present invention allows for good repositionability and slidability and, at the same time, higher final adhesion of the adhesive article.

The unique surface structure of the release liner having a network of ridges and a plurality of pits, as described above, can be obtained very economically by the processes for producing the release liner, which are described in more detail below. In these processes, a single embossing step is required for producing both, the network of ridges and the plurality of pits. Thus, the release liner for repositionable adhesive articles of the present invention can be produced very economically.

For such an embossing step, a roll is used, which has a network of channels formed in the surface. Furthermore, the surface of the roll is roughened at least between the channels, preferably by using a jet of blasting material, resulting in peaks in the surface of the roll. During an embossing step, the surface structure of the roll is usually transferred substantially completely into the surface of the release liner or a precursor thereof. Therefore, according to a further embodiment, the network of ridges, the plurality of pits and the roughness of the surface of the release liner are preferably obtainable by embossing with a roll, wherein the surface of the roll has a network of channels formed therein and has a roughness at least between the channels, such that a plurality of peaks is obtained.

A jet of blasting material usually results in stochastically distributed peaks on the surface of the embossing roll. Therefore, according to a further embodiment of the release liner, the pits are stochastically distributed at least between the ridges on the surface of the release liner.

Turning to the pits in the surface of the release liner, the pits are identified using a confocal 3D laser scanning microscope at a magnification of 100. In the area of 3.4 mm² of the plan view of the release liner surface, i.e. an area of 3.4 mm² of the projected area observed with the microscope, the deepest point of the deepest pit forms the reference point for identifying the pits and the average number thereof. The deepest point of the deepest pit may be regarded as the global minimum of the surface of the release liner in the observed area of 3.4 mm². As such, the deepest point of the deepest pit is easily identifiable under the microscope.

For the average number of pits, only pits are considered, which extend at least to a level of 10.0 μm above the deepest point of the deepest pit within said area of 3.4 mm². The pits can be easily identified with a common analysis software for confocal 3D laser scanning microscopes, for example the software Gwyddion [2.50], by laying a plane in a distance of 10.0 μm to the deepest point of the deepest pit, said plane being perpendicular to the monitoring direction of the microscope.

Since the pits extend at least to a level of 10.0 μm above the deepest point of the deepest pit, which results, in turn, in peaks of pressure-sensitive adhesive of the adhesive layer of an adhesive article, which have a somewhat similar height. In some embodiments, when the pits are obtained by embossing with a roll having the surface roughened by applying a jet of blasting material, the pits may have a depth being statistically distributed in a range from 0 to 10.0 μm above the deepest point of the deepest pit.

Furthermore, the pits considered in the average number of pits are isolated from one another at a level of 10.0 μm above the deepest point of the deepest pit, because overlapping pits are only counted as a single pit. "Overlapping pits" are pits, which have two or more local minima of the surface of the release liner, but which have a joint cross-sectional area at the level of 10.0 μm above the deepest point of the deepest pit. Thus, in the plan view of the surface of the release liner, overlapping pits form a single cross-sectional area at the level of 10.0 μm above the deepest point of the deepest pit.

Several pits (1, 2, 3) are illustrated in FIG. 1. In FIG. 1a, a schematic cross-sectional view of a small section of a release liner is shown. The release liner contains a carrier substrate (10), a thermoplastic polymer layer (20) and a thin release layer (30), which is merely illustrated as a black line in FIG. 1a. The relative size of the elements in FIG. 1a is chosen for illustration only.

Figure 1B:
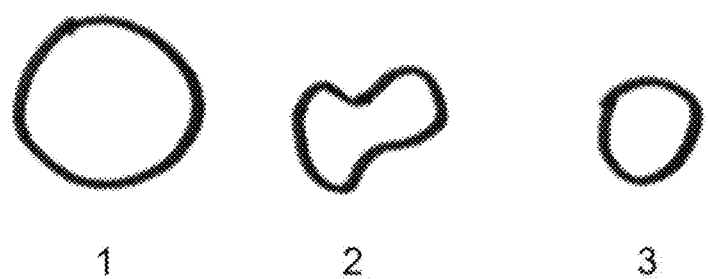
FIG. 1b illustrates a schematic plan view of the cross-sectional areas of pits in the surface of the release liner at the level of 10.0 µm above the deepest point of the deepest pit.

The section illustrated in FIG. 1a relates to a part of the release liner between the ridges, so that no ridges are illustrated in FIG. 1a. Reference sign (1a) indicates the deepest point of the deepest pit, which is the global minimum of the surface of the release liner shown in FIG. 1a. Line (A) indicates the level at 10.0 μm above the deepest point of the deepest pit (1a). A further pit (3) forming a local minimum in the surface of the release liner is shown in FIG. 1a. The pit having the reference sign (2) is an overlapping pit, because it has two local minima (2A, 2B) and a single cross-sectional area at the level (A) of 10.0 μm above the deepest point of the deepest pit (1). This is further illustrated in FIG. 1b, showing the cross-sectional areas of the pits (1, 2, 3) at the level (A) in the plan view. Furthermore, at reference sign (4), a small recess in the surface of the release layer is illustrated. Since the small recess (4) does not extend at least to the level (A) of 10.0 μm above the deepest point of the deepest pit (1), it is not counted as a pit in the sense of the present invention. Consequently, the small recess (4) is also not shown in FIG. 1b, because it does not extend at least to the level (A) of 10.0 μm above the deepest point of the deepest pit (1).

Figure 1C:
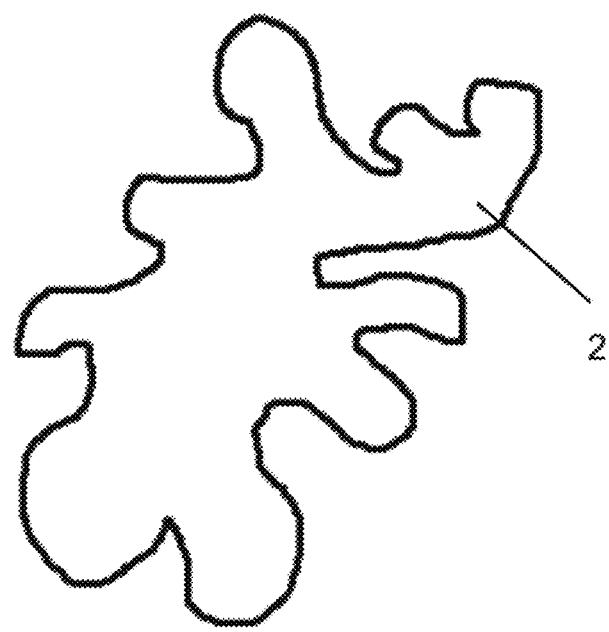
FIG. 1c illustrates a plan view of an irregularly shaped cross-sectional area of a pit in the surface of the release liner at the level of 10.0 µm above the deepest point of the deepest pit.

The cross-sectional shape of the pits is not particularly limited. In some embodiments, for example when the pits are obtained by embossing with a roll having a surface roughened by applying a jet of blasting material, the pits may have an irregular shape. In FIG. 1c, a cross-sectional area of a pit (2) having an irregular shape at the level of 10.0 μm above the deepest point of the deepest pit is illustrated. The illustrated pit (2) is an overlapping pit.

As outlined above, the pits considered in the average number of pits are isolated from one another and have a somewhat similar depth. The pits therefore result in a plurality of peaks of pressure-sensitive adhesive of the adhesive layer of an adhesive article, which are isolated from one another and have a somewhat similar height. As a consequence, the peaks of pressure-sensitive adhesive form a plurality of adhesive contact points spread over the surface of the adhesive layer. When brought into contact with the surface of an object, the adhesive article is adhered weakly but also very uniformly to the surface of the object. The inventors believe that this enables easy repositioning and sliding of the adhesive article while causing little mechanical stress to the article or the adhesive layer.

When the adhesive article is applied onto an object, the peaks of pressure-sensitive adhesive may be (partially) flattened, depending on the softness or flexibility of the adhesive. Without being bound to theory, the inventors believe that characterizing the pits of the release liner at the level of 10.0 μm above the deepest point of the deepest pit is suitable for characterizing the peaks of pressure-sensitive adhesive available for contacting an object as well as the resulting contacting points.

(2) In the release liner of the present invention, the average number of pits per 3.4 mm$^2$ of the plan view of the release liner surface is at least 50. In particular, the average number of pits is at least 70, preferably in the range of 70 to 500 and more preferably in the range of 140 to 400. Thus, the release liner has numerous pits, which result in numerous peaks or contact points of pressure-sensitive adhesive of an adhesive layer of an adhesive article. The average number of pits per 3.4 mm$^2$ can be adjusted in the surface roughening step used for making the roll. For example, by layer engraving or by the choice of the blasting material, the pressure and the distance of the blasting material jet.

(3) The cross-sectional area of the pits at a level of 10.0 μm above the deepest point of the deepest pit (1) is illustrated in FIG. 1b as discussed above. The average cross-sectional area of the pits at a level of 10.0 μm above the deepest point of the deepest pit is typically smaller than the average area between the ridges in a plan view of the surface of the release liner. In the plan view of the surface of the release liner, the average cross-sectional area per pit at the level of 10.0 μm above the deepest point of the deepest pit is, in particular, 15,000 μm$^2$ or less and preferably 10,000 μm$^2$ or less. According to a preferred embodiment, the average cross-sectional area per pit at the level of 10.0 μm above the deepest point of the deepest pit is in the range of 300 to 10,000 μm$^2$, preferably 300 to 5,000 μm$^2$, more preferably in the range of 400 to 3,000 μm$^2$.

Hence, the release liner has preferably numerous pits having a small cross-sectional area at the level of 10.0 μm above the deepest point of the deepest pit. This means, in turn, that the adhesive layer of an adhesive article has numerous peaks, which result after application of the adhesive article to the surface of an object in numerous small contact points. Thus, the adhesive force is distributed very uniformly on numerous small contact points, which is particularly suitable for repositioning and sliding the adhesive article without causing mechanical stress to the article.

(5) Furthermore, the sum of the cross-sectional areas of the pits at the level of 10.0 μm above the deepest point of the deepest pit is typically small, which is favorable in terms of repositionability and slidability. In general, the sum of the cross-sectional areas of the pits at the level of 10.0 μm above the deepest point of the deepest pit amount in total to 2 to 40%, preferably 2 to 20%, of total area in the plan view of the release liner surface. According to a preferred embodiment, it is in the range of 2 to 10% of the total area in the plan view of the release liner surface. Thus, the overall contact area of the adhesive layer is small.

The average cross-sectional area per pit at the level of 10.0 μm above the deepest point of the deepest pit and the sum of the cross-sectional areas of the pits at the level of 10.0 μm above the deepest point of the deepest pit, respectively, can be adjusted in the surface roughening step used for making the roll. For example, by layer engraving or by the choice of the blasting material, the pressure and the distance of the jet of blasting material. In general, in case a jet of blasting material is used in the surface roughening step, the coarser the particles of blasting material, the smaller is the number of pits and the larger are the cross-sectional areas of the pits at the level of 10.0 μm above the deepest point of the deepest pit. Accordingly, smaller particles of blasting material result, in general, in a larger number of pits and smaller cross-sectional areas of the pits at the level of 10.0 μm above the deepest point of the deepest pit. The pressure of the jet of blasting material can be adjusted by the distance between the nozzle for ejecting the jet of blasting material and the surface to be roughened. In general, when the same blasting material is used, a higher pressure results in deeper pits having a larger cross-sectional area at the level of 10.0 μm above the deepest point of the deepest pit.

According to a preferred embodiment of the release liner, the average number of pits is in the range of 70 to 500, the average cross-sectional area per pit at the level of 10.0 μm above the deepest point of the deepest pit is in the range of 300 to 5,000 μm$^2$, and the sum of the cross-sectional areas of the pits at the level of 10.0 μm above the deepest point of the deepest pit is 2 to 20%, preferably 2 to 10%, of the area in the plan view of the release liner surface. According to a particularly preferred embodiment, the average number of pits is in the range of 140 to 400, the average cross-sectional area per pit at the level of 10.0 μm above the deepest point of the deepest pit is 400 to 3,000 μm$^2$, and the sum of the cross-sectional areas of the pits at the level of 10.0 μm above the deepest point of the deepest pit is 2 to 20% and preferably 2 to 10% of the area in the plan view of the release liner surface.

(6) As mentioned above, the surface of the release liner has a roughness at least between the ridges. The surface roughness Ra of the release liner can be determined using a confocal 3D laser scanning microscope at a magnification of 100. The method is described in more detail below. Between the ridges, the surface of the release liner on the side of the release layer has, in particular, a roughness Ra of at least 0.9 μm, preferably 1.0 to 6.0 μm and more preferably 1.3 to 4.0 μm. Furthermore, Rz is usually at least 3.5 μm, preferably 4 to 18 μm and more preferably 5 to 10 μm.

According to a preferred embodiment, the entire surface of the release liner is roughened, so that it has also a roughness at the ridges. This could, for example, be achieved by treating the entire surface of an embossing roll with a jet of blasting material after a network of channels has been formed therein.

Surprisingly, it has been found that, when the entire surface structure of the release liner is roughened, the adhesive article may provide a particularly favorable aesthetic impression, because the channels derived from the ridges can be seen or otherwise detected less clearly (if at all) through the article such as an adhesive film. When the entire surface of the release liner is roughened, the edges and side-walls of the ridges are roughened as well. It is assumed that this diffuses the contours of the ridges, which results in diffused contours of the channels in the adhesive layer.

(7) When the surface on the side of the release layer has a roughness at the ridges, the roughness Ra at the ridges is, in particular, at least 0.9 µm, preferably 1.5 to 6.0 µm and more preferably 2.0 to 4.5 µm. The inventors have found that the roughness may be slightly higher at the ridges than between the ridges, when the same blasting material is used. Rz may be at least 10 µm, preferably 10 to 25 µm and more preferably 10 to 20 µm.

As regards the ridges, the shape of the ridges or their pattern is not particularly limited as long as the network of ridges is configured to form a network of channels in the adhesive layer of an adhesive article, and the network of channels can serve as air egress channels.

For example, the network of ridges may have an irregular pattern with stochastically formed polygons as described in DE 20 2004 001 802 U1 or a regular polygonal pattern such as a rectangular pattern. Preferably, the network of ridges has a rectangular pattern.

As regards the height and the width of the ridges and the pitch of the pattern, the release liner of the present invention is not particularly restricted, and embodiments known to the skilled person may be used. In a rectangular pattern, the pitch is usually 2,000 µm or less, in particular 1,000 µm or less such as 300 to 800 µm.

(8) The release liner according to the present invention has a thermoplastic polymer layer. All common thermoplastic polymer materials that are known in the art for making such polycoated release liners may be used. Preferably, the thermoplastic polymer layer comprises at least one of polyethylene, polypropylene and mixtures thereof. Typically, at least 80 wt. %, preferably at least 90 wt. %, of the thermoplastic polymer layer are comprised of polyethylene and/or polypropylene. It is further preferred that the thermoplastic polymer layer consists of polyethylene and/or polypropylene as the only thermoplastic polymers, and polyethylene being particularly preferred in view of its embossing properties. For example, the thermoplastic polymers may be a blend of the polyethylenes LDPE and HDPE in a ratio of 1:10 to 10:1.

Furthermore, the thermoplastic polymer layer has preferably a basis weight of 10 to 60 g/m$^2$, more preferably 15 to 45 g/m$^2$ and more preferably 18 to 40 g/m$^2$. A thermoplastic polymer layer having such a basis is preferably comprised of the above-described preferred thermoplastic polymers.

(9) As mentioned above, the release layer is comprised of a release material. Typically, the release layer comprises and preferably consists of silicone. The silicone is not particularly limited, and all kinds of silicones that are commonly used for coating release liners may be used. Particularly preferred is the use of heat curable or UV curable silicones, which may be coated with a method known by the skilled person in liquid form onto the thermoplastic polymer layer and then be cured. In particular, the release layer covers the entire surface of the release liner on the side of the release layer. Thus, the release layer also covers the surface of the release liner in the pits.

Typically, the release layer of the release liner is quite thin and may preferably have a basis weight of 0.1 to 3.0 g/m$^2$, preferably 0.3 to 1.6 g/m$^2$, more preferably 0.4 to 1.1 g/m$^2$.

As regards the carrier substrate, the release liner may, for example, contain a sheet of paper or a PET film as the carrier substrate. Preferably, the carrier substrate is a sheet of paper. The paper type is not particularly limited and, in principle, all kinds of papers that are conventionally used for making release liners, which are coated with a thermoplastic polymer and a release material, may be used.

The carrier substrate or the sheet of paper, respectively, has preferably a basis weight of 60 to 160 g/m$^2$, more preferably 70 to 140 g/m$^2$ and most preferably 80 to 120 g/m$^2$.

According to another embodiment, the carrier substrate is a PET-film having a thickness of 30 to 150 µm, preferably 36 to 120 µm and more preferably 50 to 100 µm.

According to a further embodiment, the release liner comprises a further thermoplastic polymer layer, which is arranged on the carrier substrate on the side opposite to the release layer. Thus, according to this embodiment, the carrier substrate is sandwiched between two thermoplastic polymer layers, which is preferable in terms of moisture protection of the carrier substrate and shape retention of the release liner.

The further thermoplastic polymer layer can be formed independently from the thermoplastic polymer layer of the release side of the release liner. Preferred embodiments of the further thermoplastic polymer layer correspond to the preferred embodiments of the above-described thermoplastic polymer layer in terms of materials and basis weight.

(10) According to a further aspect of the present invention, an adhesive article is provided. The adhesive article comprises:

an article, optionally containing a coloring agent and/or having one or more of a grapheme and an image;
an adhesive layer of a pressure-sensitive adhesive material arranged on the article; and
a release liner according to any one of the embodiments arranged on the adhesive layer,
wherein the release layer of the release liner is in contact with the adhesive layer and the network of ridges of the surface of the release liner forms a network of channels in the adhesive layer and the pits in the surface of the release liner form peaks in the adhesive layer.

As mentioned above, the network of channels extends to at least one edge of the adhesive layer and preferably extends over the entire adhesive layer.

The adhesive article benefits from the unique surface structure of the release liner according to the present invention. After removal of the release liner, it can be applied onto the surface of an object as a new substrate. The adhesive article shows the advantages outlined above in connection with the release liner of the present invention such as good repositionability and slidability, good final adhesion to the object, and, preferably, a good aesthetic impression without showing regular structures.

The article may contain one or more coloring agents. It may have one or more graphemes or images, which may be printed or otherwise applied thereon. Graphemes include e.g. words, letters and symbols.

(11) The article is preferably a film made of a polymer material, e.g. a PVC film, which comprises or consists of PVC and, optionally, conventional additives such as fillers and plasticizers. The article or film may, for example, have a thickness of 30 to 150 µm. Of course, it is also possible to use a laminate of two or more films or another substrate as the article. For example, the article may be a PVC film used for car wrapping, such as a soft and flexible film complying with the curvatures occurring on car bodies.

Due to the pressure-sensitive adhesive, the adhesive article is self-adhesive after removal of the release liner.

Furthermore, the pressure-sensitive adhesive material is not particularly limited, and all common pressure-sensitive adhesive materials used for adhesive-backed articles which are capable of retaining the surface structure after removal of the release liner may be used. According to a preferred embodiment, the pressure-sensitive adhesive material comprises or consists of at least one acrylic polymer and, optionally, conventional additives. The adhesive layer has preferably an average thickness of 20 to 60 µm. Suitable pressure-sensitive adhesives are, for example, disclosed in U.S. Pat. No. 4,812,541, or in the "Handbook of Pressure Sensitive Adhesive Technology", Ed. Donatas Satas, $2^{nd}$ ed. 1989, 396-456. A suitable pressure-sensitive adhesive may, for example, comprise or consist of a copolymer as the acrylic polymer which is based on at least one alkyl acrylate and at least one comonomer. Suitable alkyl acrylates include, for example, n-butyl acrylate, ethyl acrylate, 2-ethylhexyl acrylate, iso-octyl acrylate, isononyl acrylate, and octadecyl acrylate. Suitable comonomers include, for example, acrylic acid, acryl amide, N,N-dimethylacrylamide, methacrylic acid, methyl methacrylate, acrylonitrile, and vinyl acetate.

A further aspect of the present invention is directed at processes for producing the release liner according to the present invention. Hereinafter, two alternative processes, which differ from another in that the release layer is applied before the embossing step or after the embossing step, respectively, and preferred embodiments thereof are described. Unless otherwise noted, the preferred embodiments are intended to specify both alternatives.

(12) According to the first alternative, the process for producing a release liner according to the present invention comprises the steps of:
(a) providing a roll;
(b) forming a network of channels into a surface of the roll and roughening the surface of the roll to produce a plurality of peaks in the surface, wherein the roughening is performed either before or after the formation of the network of channels, such that the surface of the roll resulting from step (b) is roughened at least between the channels and contains a plurality of peaks in the surface;
(c) providing a composite comprising:
a carrier substrate,
a thermoplastic polymer layer applied on one side of the carrier substrate, and
a release layer applied on the thermoplastic polymer layer on the side opposite to the carrier substrate; and
(d) embossing the thermoplastic polymer layer and the release layer with the roll obtained in step (b) to form a network of ridges which result in elevations of the surface of the release liner on the side of the release layer and to roughen said surface of the release liner at least between the ridges resulting in a plurality of pits as described above in the context of the release liner.

(13) According to the second alternative, the process for producing a release liner according to the present invention comprises the steps of:
(a) providing a roll;
(b) forming a network of channels into a surface of the roll and roughening the surface of the roll to produce a plurality of peaks in the surface, wherein the roughening is performed either before or after the formation of the network of channels, such that the surface of the roll resulting from step (b) is roughened at least between the channels and contains a plurality of peaks;
(c) providing a composite comprising:
a carrier substrate, and
a thermoplastic polymer layer being applied on one side of the carrier substrate;
(d) embossing the thermoplastic polymer layer with the roll obtained in step (b) in order to form a network of ridges and to roughen the surface of the thermoplastic polymer layer on the side opposite to the carrier substrate at least between the ridges resulting in a plurality of pits; and
(e) applying a release layer on the thermoplastic polymer layer obtained in step (d) on the side opposite to the carrier substrate to obtain the release liner,
wherein, in the release liner resulting from step (e), the thermoplastic polymer layer and the release layer include a network of ridges which result in elevations of the surface of the release liner on the side of the release layer, and the surface on the side of the release layer is roughened at least between the ridges, such that it has a plurality of pits as described above in the context of the release liner.

The roll provided in step (a) (of both alternative processes) may, for example, be a conventional embossing roll or a chill roll. Preferably, it is a chill roll, such as a chill roll for extrusion coating processes, which has an outer and in inner steel shell, so that a chill medium such as water can be led through the chill roll in order to cool the molten polymer material. Typically, the chill roll has a diameter of 150 to 1,300 mm, preferably 400 to 1,200 mm, more preferably 650 to 1,150 mm. In general, a large diameter allows for high production rates. The chill roll usually has a copper layer on its surface for producing structures therein. The copper layer usually has a thickness of 300 to 500 µm, such as 400 µm. After formation of the structures in step (b), a chromium layer of 20 to 50 µm thickness may be formed on the surface of the roll, for example, by a plating process in order to reduce the adhesion between the surface of the roll and the thermoplastic polymer material.

In step (b) (of both alternative processes), a structure is formed in the surface of the roll. The network of channels is formed by engraving the surface, for example, by using direct laser engraving. The channels will produce the network of ridges of the release liner. The shape of the channels is not particularly limited as long as the resulting network of ridges is capable of producing air egress channels in the adhesive layer.

The channels are typically formed with an average depth of 5 to 45 µm, preferably 10 to 35 µm, more preferably 15 to 30 µm. The channels are usually formed with a width of 20 to 150 µm, preferably 40 to 100 µm, as measured at the outer ends of the channels. The dimensions of the channels can be measured using a microscope.

In addition, the surface of the embossing roll is roughened, so that it contains a plurality of peaks, which form the pits in the surface of the release liner.

In the embossing step, the surface structure of the roll is transferred into the thermoplastic polymer layer and, if present in step (d), the release layer. The surface structure produced by embossing is substantially complementary to the surface structure of the roll. "Substantially complementary" means that the produced structures have a similar shape, but that the transfer is often not 100%, but usually 80 to 98% depending on the materials to be embossed. This means that channels in the surface of the embossing roll having a depth of 20 µm usually produce ridges with a height of 16 to 19.6 µm. Accordingly, the desired height of the ridges can be obtained by adjusting the depth of the channel. In addition, the height of the ridges may also depend on the thickness of the thermoplastic layer described in step (c) of the two alternatives. In general, the lower this thickness the less of the roll's channel depth is transferred into the thermoplastic layer.

In case the release layer is formed after the embossing step, it further modifies the surface structure of the release liner.

(14) According to a preferred embodiment, the surface of the roll is roughened using a jet of blasting material. Suitable blasting materials are, for example, aluminum oxide (in particular corundum) particles, glass beads, ceramic beads, rounded cut steel wire, and cast beads. Preferably, corundum particles are used.

The blasting material typically has an average diameter in the range of 30 to 150 µm, preferably 50 to 100 µm, as determined by a sieving process. As an Example, corundum particles having a grit size of 70 may be used.

The blasting material is usually applied from a distance of 50 to 100 mm, such as 60 mm, with a pressure or 5 to 10 bar and a particle speed of 70 to 120 m/s at the opening of the nozzle. The surface of the roll is either roughened before or after the channels are engraved. When the channels are engraved after the roughening, the surface of the release liner has a roughness and, thus, pits between the ridges whereas the surface at the ridges might not be particularly roughened. On the other hand, when the roughening, in particular with a jet of blasting material, is performed after the channels are engraved, the release liner has a roughness over the entire surface, i.e. between the ridges and at the ridges.

According to a preferred embodiment (of the first and second alternative), the surface of the roll is roughened after formation of the channels, for example, by using a jet of blasting material as described above. As a result, the entire surface of the roll used for embossing is roughened and the contour of the channels or other edges in the surface of the roll are diffused. In the embossing step, ridges with a diffused contour are formed, which result in a favorable impression of an adhesive article, because the structures formed by the release liner in the adhesive layer are less likely recognized by an observer.

According to a further preferred embodiment, the channels of the roll form a rectangular pattern having a pitch as mentioned above. The rectangular pattern is preferably arranged in a 40 to 50° angle, more preferably a 45° angle to the running direction of the roll.

In step (c) of the first alternative, a composite is provided which comprises
  a carrier substrate,
  a thermoplastic polymer layer applied on one side of the carrier substrate, and
  a release layer being applied on the thermoplastic polymer layer on the side opposite to the carrier substrate.

Preferably, the composite also comprises a further thermoplastic polymer layer applied on the other side of the carrier substrate.

The composite may be produced by conventional methods which are known to the skilled person. The preferred embodiments in terms of materials and basis weights described in the context of the release liner are also applicable.

In step (d) of the first alternative, both the thermoplastic polymer layer and the release layer are embossed using the roll obtained in step (b). For this, the composite is preferably heated in order to soften the thermoplastic polymer and then passed through a pair of rolls, one of the rolls is the roll of step (b) such as an embossing roll and the other roll may be a nip roll, whereupon the structure in the surface of the roll of step (b) is transferred onto the thermoplastic polymer layer and the release layer. The embossing process is easier to control the closer the surface temperature of the thermoplastic layer gets to the melting temperature. Under preferred conditions, the temperature of the composite is 10 to 20° C. below of the melting temperature of the thermoplastic polymer. The embossing roll may be heated, for example to 80 to 160° C., to facilitate the embossing.

In step (c) of the second alternative, a composite is provided which comprises
  a carrier substrate, and
  a thermoplastic polymer layer applied on one side of the carrier substrate.

Preferably, the composite also comprises a further thermoplastic polymer layer applied on the other side of the carrier substrate so that the carrier substrate is sandwiched between the two thermoplastic polymer layers.

The composite may be produced by conventional methods which are known to the skilled person. The preferred embodiments in terms of materials and basis weights described in the context of the release liner are applicable.

In step (d) of the second alternative, the thermoplastic polymer layer is embossed using the roll obtained in step (b). For this, the composite can be heated in order to soften the thermoplastic polymer and then be passed through a pair of rolls, one of the rolls is the roll of step (b) and the other roll may be a nip roll, whereupon the structure of the surface of the roll of step (b) is transferred onto the thermoplastic polymer layer.

According to a further preferred embodiment of the second alternative, the thermoplastic polymer layer is applied by extrusion coating on the carrier substrate and then directly passed between a chill roll obtained in step (b) and a nip roll. In this case, steps (c) and (d) are combined and no separate heating of the thermoplastic polymer layer is required, as it is still molten due to the extrusion coating. For example, the carrier sheet, optionally having a thermoplastic polymer layer on the backside is led through the rolls and hot polyethylene having a temperature of 300 to 320° C. is fed from a die into the nip. The hydraulic line pressure between the rolls is usually set between 30 and 40 kg/cm. The chill roll usually has a diameter between 150 and 1,300 mm, preferably between 400 and 1,200 mm, more preferably between 650 and 1,150 mm. The temperature of the chill medium, such as water, in the roll is usually between 10 and 24° C., preferably between 12 and 22° C., and more preferably between 14 and 20° C.

A nip roll may be used which has a steel core and a mantle made of rubber, such as EPDM or other rubber polymer blends. The surface of the nip roll usually has Shore A hardness between 80 and 85. The diameter of the nip roll is preferably between 150 to 300 mm, more preferably between 150 and 200.

After embossing the thermoplastic polymer layer according to the second alternative, the release layer is formed thereon in step (e). For this, a curable release material, such as a curable silicone material, may be coated onto the thermoplastic polymer layer with one of the methods known by the skilled person and then be cured.

Said further embodiment of the second alternative is preferred, because a one-step operation for applying the thermoplastic polymer layer and embossing said layer is more cost effective than embossing the thermoplastic polymer layer in a second operation. For example, it saves energy compared to a separate embossing step, as it does not require another process with a further heating step for heating the thermoplastic polymer material.

(15) According to a further aspect of the present invention, a process for decorating an article is provided. The process comprises the steps of:
- (A) providing an object;
- (B) providing an adhesive article according to one of the above embodiments;
- (C) removing the release liner from the adhesive article to expose the adhesive layer; and
- (D) bringing the exposed adhesive layer into contact with a surface of the object, optionally repositioning or sliding the article, and pressing the article against the object to obtain the object decorated with the article.

The object may be any substrate that is suitable for applying an adhesive article thereon, such as a car, a truck, a bus, an airplane or any other kind of vehicle or a part thereof. In another application the adhesive article may be used for advertising on large surfaces like windows or panels. Smaller objects like bottles or any other consumer goods may become labelled with the article as well. Preferably, the adhesive article is applied onto a smooth surface of the object.

EXAMPLES

Example 1

Production of Chill Roll:

A conventional chill roll made of steel and having a copper layer of 400 µm thickness on the surface was provided. The cylinder of the roll used for embossing had an outer diameter of 205 mm and a width of 400 mm. A quadratic pattern of channels was formed into the copper surface in an angle of 45° to the running direction of the roll by conventional direct laser engraving. The pitch was set to 390 µm. The channels had a depth of 20 µm and a width of 60 µm. The areas between the ridges were approx. 330 µm×330 µm.

The thus obtained roll was subjected to a surface roughening step using a jet of blasting material. As the blasting material, the blasting material SE104 from the company Saueressig (spherical corundum particles having a grit size of 70) was used. The blasting material was applied from a distance of 60 mm, with a pressure of 7 bar, and a particle speed of 100 m/s at the opening of the nozzle.

Subsequently, a thin chromium layer having a thickness of 40 µm was applied by conventional plating on the roughened copper surface.

Production of Release Liner:

The paper used as the carrier substrate was a smooth fine, 100% short fiber paper made on a fourdrinier type paper machine with an in-line calender. It had a basis weight of 100 g/m² and an extrusion coated polyethylene layer of 30 g/m² on one side. The opposite side, the free side of the paper substrate, was extrusion coated with a polyethylene layer as the thermoplastic polymer layer at an extrusion temperature of 310° C. and a coat weight of 30 g/m². In this coating operation, the extruded molten PE was brought together with the already onesidedly coated paper substrate in the nip between a rubber pressure roll and the above-described chill roll. The freshly coated PE layer was oriented towards the chill roll side, the paper layer was oriented towards the pressure roll side. By means of a pressure of 35 kg/cm applied between the two rolls, the PE was pressed onto the paper surface, thus generating the bond between PE and paper, and against the chill roll resulting in the substantially complementary surface structure of the PE layer. Ground water was used as the chill medium.

Finally, a platinum-catalyzed solvent silicone coating was applied as a liquid coating by rotogravure coating on the structured polyethylene layer. After evaporation of the solvent and curing of the silicone, the resulting coat weight of the release layer was 0.8 g/m² as measured by X-Ray Fluorescence Analysis with an OXFORD Instruments analyzer.

Formation of an Adhesive Article:

A pressure-sensitive adhesive material based on an acrylic polymer, commercially available under the name Loctite Duro-Tak 4003-10 by Henkel, was coated as a solvent solution on the release surface of the above-produced release liner with a thickness of 70 µm. The adhesive coating was dried at a temperature of 105° C. for 1 min, yielding a dry adhesive layer of 34 µm thickness. Then, the resulting composite was laminated on its adhesive surface with a white, glossy, calendered PVC film having a thickness of 80 µm, yielding the final self-adhesive article on the release liner.

Comparative Example 1

A conventional chill roll made of steel having a copper layer of 400 µm thickness on the surface was provided. The cylinder of the chill roll used for surface structuring has an outer diameter of 700 mm and a width of 1,850 mm. A chill roll was produced as described in Example 1 except that the chill roll was not roughened using a jet of blasting material. The thickness of the chromium layer was 25 µm. In accordance with Example 1, a release liner and an adhesive article were produced.

Example 2

A chill roll was produced according to Example 1, except that the pitch was 520 µm.

Subsequently, a release liner and an adhesive article were produced according to Example 1.

Comparative Example 2

A conventional chill roll made of steel having a copper layer of 400 µm thickness on the surface was provided. The cylinder of the chill roll used for surface structuring has an outer diameter of 700 mm and a width of 1,850 mm. A pattern of irregular polygons with three to seven corners generating lines or channels was formed into the copper by conventional direct laser gravure. The average area of the areas between the channels was approximately 1,000,000 µm². The channels had a depth of 23 µm and a width of 120 µm.

Subsequently, a thin chromium layer having a thickness of 25 µm was applied by conventional plating on the engraved copper surface. There was no particular method of surface roughening applied.

The release liner and the corresponding pressure sensitive adhesive article were produced by the same methods as described in Example 1.

Measuring Methods

Characterization of Pits and Surface Roughness

For the measurement, a circular sample of 100 cm² is cut from the release liner and fixed on the objective slide of a confocal 3D layer scanning microscope.

The number of pits, the average cross-sectional area per pit and the area percentage of the pits are determined using a confocal 3D laser scanning microscope, for example the microscope VK-X160K from Keyence, at a magnification of 100 and an analysis software, for example Gwyddion [2.50]. Three arbitrarily selected areas of 3.4 mm² in the plan view of the release liner surface are analyzed and the average is taken.

Ra and Rz are determined using a confocal 3D laser scanning microscope, for example the microscope VK-X160K from Keyence, at a magnification of 100 and an analysis software, for example Gwyddion [2.50]. The average from 6 arbitrarily selected sections is taken.

Detailed Method Description

A circular sample with an area of 100 cm² is carefully cut from the release liner using a circle cutter. The surface to be measured is checked for any debris or other contaminants. Only sections of the surface, which are free of contamination and damage, are used for measuring.

The obtained circular release liner is placed on the object slide of a confocal 3D laser scanning microscope, so that the release layer faces the lens. Outside of the area to be measured, the release liner is fixed at three points with 5 g-weights, such that it lies flat on the object slide and does not shift. In principle, all common confocal 3D laser scanning microscopes may be used, for example the confocal 3D laser scanning microscope VK-X160K from Keyence, which was used herein.

The release liner surface is scanned at a magnification of 100. The plan view of the surface of the release liner corresponds to the projected area observed by the microscope.

As regards the characterization of the pits, an area of 3.4 mm² of the projected area is scanned with the microscope and analyzed with the analysis software. In general, an appropriate software is provided with the microscope by the supplier. Herein, the software Gwyddion [2.50] was used. Gwyddion [2.50] is available open source, and similar software may be used as well. In general, suitable analysis software is known to the skilled person.

With the analysis software, the deepest point of the deepest pit is identified. The deepest point of the deepest pit is a global minimum in the area of 3.4 mm². The pits in the release liner surface can easily be distinguished from artifacts, if present, which may appear as sharp needle-like formations of the size of one or a few pixels and differ significantly in height from the surrounding pixels.

With the analysis software, a theoretical plane is placed in a distance of 10.0 µm above the deepest point of the deepest pit. This plane is perpendicular to the monitoring direction of the microscope and constitutes "the level of 10.0 µm above the deepest point of the deepest pit", which is line (A) in FIG. 1a. In general, the analysis software like Gwyddion [2.50] allows for marking and quantifying the cross-sectional areas of the pits in the surface of the release liner at this level.

The number of pits extending at least to this level is counted. Overlapping pits, that is, pits having a joint cross-sectional area at the level of 10.0 µm above the deepest point of the deepest pit, are counted as a single pit.

With the analysis software, the total area of the pits at the level of 10.0 µm above the deepest point of the deepest pit is determined. Said total area is the sum of all cross-sectional areas of the pits at this level. The average cross-sectional area per pit is calculated (total cross-sectional area of the pits/number of pits). Furthermore, the area percentage of the cross-sectional areas of the pits at this level is calculated (total cross-sectional area of the pits/3.4 mm²).

For obtaining the number of pits, the average cross-sectional area per pit and the area percentage of the pits, the measurement is conducted at 3 different, arbitrarily selected sections of the release liner and the average of the obtained values is taken.

Release liners having a flat and smooth surface between the ridges do not show real pits but only minor variations in the surface. When the deepest point is taken, the entire area between ridges could be regarded a single pit, so that the cross-sectional area at the level of 10.0 µm above the deepest point corresponds to the area between the ridges.

As regards the roughness Ra and Rz, the surface roughness parameters Ra and Rz are also determined using the confocal 3D laser scanning microscope at a magnification of 100. The ridges and the areas between the ridges are considered to be structural elements of the surface. For measuring the surface roughness of one of these structural elements, a surface area on such a structural element is selected as a measuring section. The area is selected such that it is parallel to a ridge. Furthermore, the area should be as long as possible without crossing or contacting another structural element.

The analysis software, such as Gwyddion [2.50] as used herein, automatically calculates the Ra and Rz for the measuring section. For this, the software divides the measuring section into numerous parallel sub-sections having the width of a single pixel. The sub-sections are then summed up to a single measuring section to calculate the roughness parameters.

The measurements are conducted at 6 arbitrarily selected sections of the release liner, and the average of the obtained values is taken.

Loop Tack Measurement

The loop tack was measured according to the method "Loop Tack Measurement" in the FINAT Technical Handbook, 9$^{th}$ edition, 2014, pp. 22-23.

Evaluation

A lacquered aluminum sheet of 1,100 mm×750 mm was used. The adhesive article as obtained in the above-described Examples and Comparative Examples, i.e. a laminate of the release liner, adhesive and white PVC film, was cut to a rectangular sheet of 250 mm×75 mm around a template of the same size using a sharp knife. The adhesive article was then tested with regard to repositionability, slidability, and visibility as described below. For testing the air egress, the adhesive article was cut as described below.

Repositionability:

The release liner was removed, and the adhesive article was placed on the aluminum sheet mainly by the weight of the adhesive article itself and some very low manual pressure applied with one finger. The adhesive article was not applied completely, so that an area of 1 to 1.5 cm² remained for holding the article.

Shortly after putting down, after about 1 to 2 s, the adhesive article was pulled off again and reapplied, and the repositionability was evaluated.

Good: Slight resistance, adhesive article could be pulled off and reapplied without any substantially visible irreversible elongation, or deformation of the film.

Moderate: Some resistance, minor deformation of the adhesive article.

Poor: Considerable resistance, visible deformation of the adhesive article.

The test was conducted independently by three persons. The average results are shown in Table 1.

Slidability:

The release liner was removed, and the adhesive article was placed on the aluminum sheet just by its own weight, without applying additional pressure. The adhesive article was not applied completely, so that an area of 1 to 1.5 cm² remained for holding the article.

Shortly after putting down, after about 1 to 2 s, the adhesive article was pulled in two different directions, from left to right, and towards the test person for a distance of 10 cm in each direction, and the slidability was evaluated.

Very good: The adhesive article slid very easily.

Good: The adhesive article slid easily, substantially without visible irreversible elongation, or deformation of the film.

Moderate: The adhesive article showed some resistance against sliding; minor elongation of the adhesive article was observed.

Poor: The adhesive article showed considerable resistance against sliding and was remarkably elongated during the test.

Very poor: Sliding of the adhesive article was impossible, the article would become extremely elongated or just stay at the position where laid down.

The test was conducted independently by three persons. The average results are shown in Table 1.

Air Egress:

A circular specimen of the adhesive article with about 100 cm² was cut, the release liner was removed, and the specimen was applied completely onto the aluminum sheet without applying additional pressure. Now the specimen was manually pressed with a finger from the outer rim of the specimen spirally towards the center, such that an air bubble of approx. 1 cm in diameter was formed under the article. Then, the air bubble was squeezed out with the finger from the center towards the rim and the ease of air egress was evaluated.

Very good: Air bubble could be removed very easily with one attempt.

Good: Air bubble could be removed easily with some attempts.

Moderate: Air bubble could be removed with several attempts.

Poor: Air bubble could be removed with many attempts after significant time.

Very poor: Air bubble could not be removed, even with effort.

The test was conducted independently by three persons. The average results are shown in Table 1.

Visibility:

The release liner was removed, and the adhesive article was placed completely on the aluminum sheet and spread out manually on the aluminum sheet using a 2-kg roller, such that no air bubbles remained. The applied adhesive article was visually inspected under normal light, from above and from the side to evaluate, whether the channel structures of the adhesive layer could be detected at the surface of the PVC film.

Very good: No structures were visible.

Good: Some surface structuring was visible.

Moderate: Obvious surface structuring was visible.

Poor: The actual structures of the adhesive were visible.

TABLE 1

|  | Example 1 | Example 2 | Comparative Example 1 | Comparative Example 2 |
| --- | --- | --- | --- | --- |
| Number of pits | 101 | 188 | 25[1] | 10[1] |
| Average area per pit (μm²) at 10.0 μm above deepest point | 1,102 | 1,231 | 109,680 | 263,900 |

TABLE 1-continued

|  | Example 1 | Example 2 | Comparative Example 1 | Comparative Example 2 |
| --- | --- | --- | --- | --- |
| Area percentage of pits (%) at 10.0 μm above deepest point | 3.3 | 6.8 | 80.7 | 73.9 |
| Roughness Ra (μm) between the ridges | 1.36 | 1.43 | 0.42 | 0.91 |
| Roughness Rz (μm) between the ridges | 5.8 | 6.5 | 2.1 | 3.2 |
| Loop Tack (cN/25 mm) | 12.5 | 6.4 | 18.11 | 13.75 |
| Repositionability | good | good | poor | poor |
| Slidability | very good | very good | very poor | poor |
| Air egress | good | very good | very good | very good |
| Visibility | very good | very good | very good | very good |

[1]The release liners of the Comparative Examples do not have pits as such, but only minor variations in the surface between the ridges. For comparison, the entire area between ridges is counted as one pit.

The release liners according to Examples 1 and 2 showed both good repositionability and excellent slidability. Although the surface of the release liners had been roughened, air egress properties and visibility of the structures are good and suitable for demanding applications such as decoration purposes. In contrast to that, the conventional release liners of Comparative Examples 1 and 2 showed insufficient repositionability and slidability. The loop tack test confirms the observations, because initial adhesion of the adhesive articles of Examples 1 and 2 was lower than the initial adhesion of the adhesive articles of Comparative Examples 1 and 2.

Figure 2:
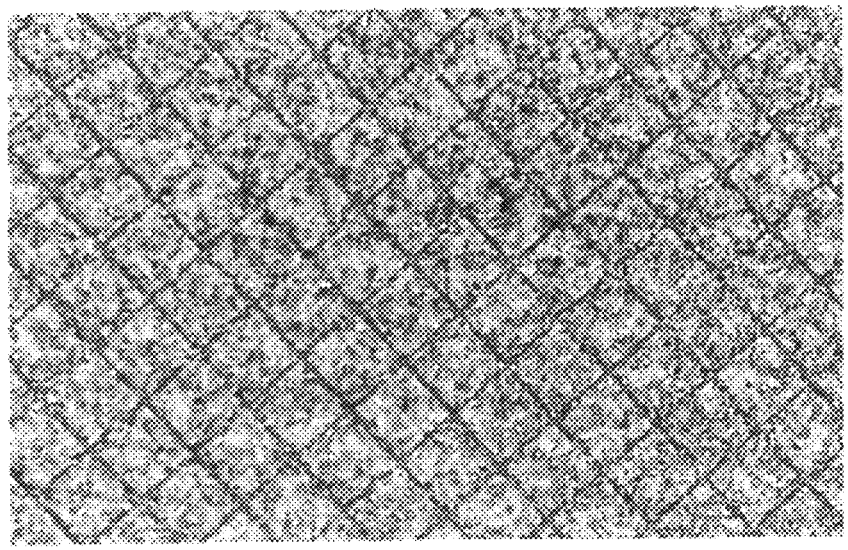
FIG. 2 shows a microscope image of the surface of the roll used for making the release liner according to Example 2.

In FIG. 2, an optical microscope image (obtained with a magnification of about 10) of the roll used for making the release liner according to Example 2 is shown. As can be seen in FIG. 2, the continuous channels form a network on the surface of the roll. In addition, due to the roughening step using a jet of blasting material, the entire surface of the roll appears to be blurred. In the embossing step, the surface structure of the chill roll is transferred substantially completely into the surface of the release liner forming a network of ridges and pits.

Figure 3:
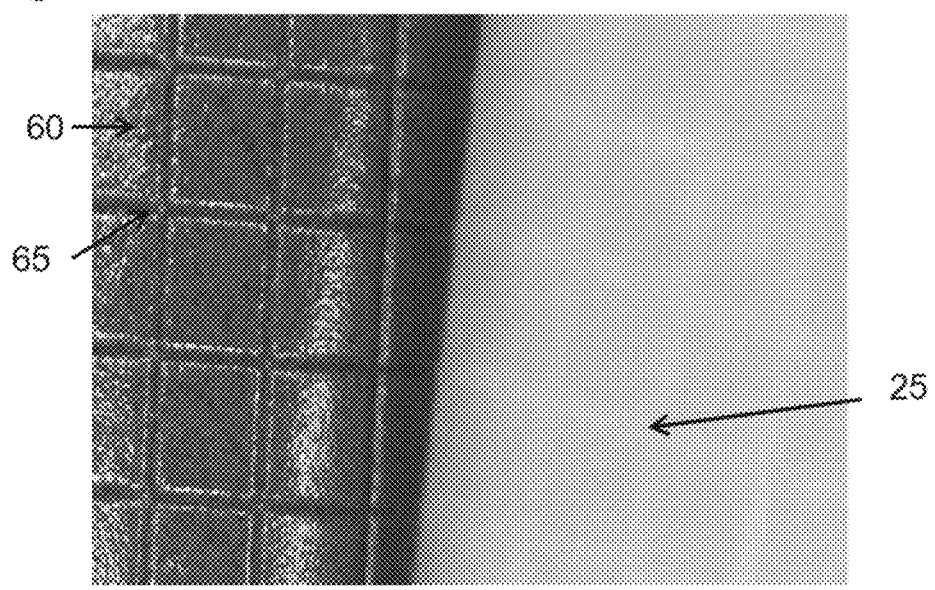
FIG. 3 shows a microscope image of an adhesive article according to Example 2, where the release liner is partially removed.

In FIG. 3, an optical microscope image (obtained with a magnification of about 20) of an adhesive article according to Example 2 is shown, wherein the adhesive article is in the stage of a partially removed release liner (right). The complementary structure comprising a network of channels (65) formed in the adhesive layer (60) is revealed (left). The roughened surface of the release liner has been transferred into the surface of the adhesive layer (60).

Figure 4A:
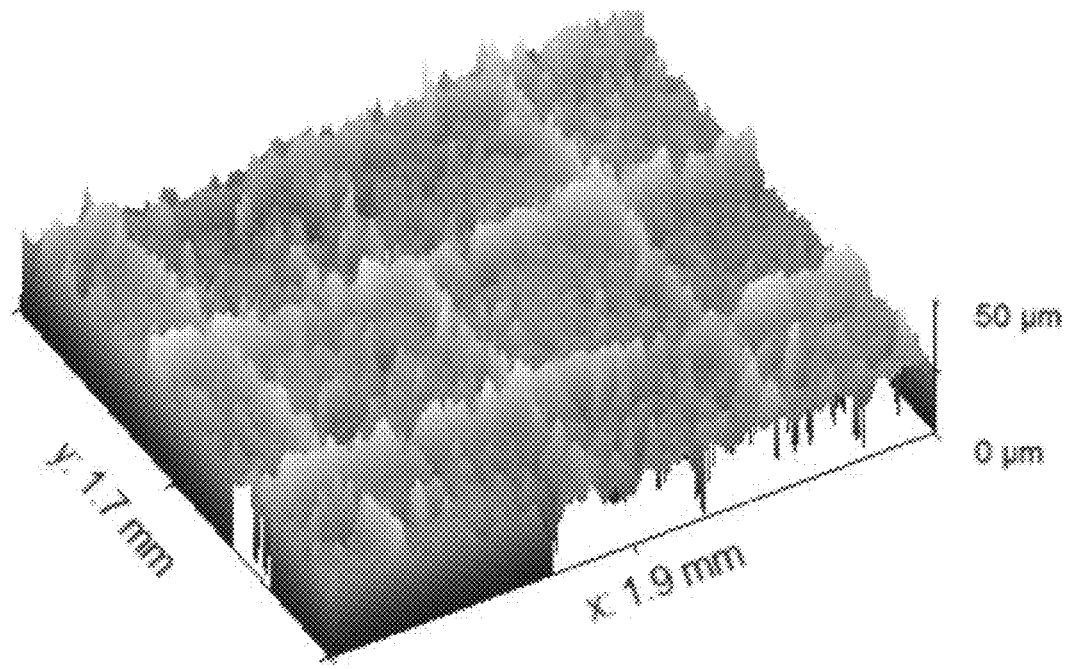
FIG. 4a shows an image of the surface of the release liner according to Example 2 obtained with a confocal 3D laser scanning microscope.

In FIG. 4a, an image of the surface of the release liner of Example 2 is shown. The image was obtained using a confocal 3D laser scanning microscope at a magnification of 100. As can be seen, the entire release liner surface is roughened, so that there are numerous pits in the surface. Furthermore, the network of ridges can be clearly seen although the surface is also roughened at the ridges.

Figure 4B:
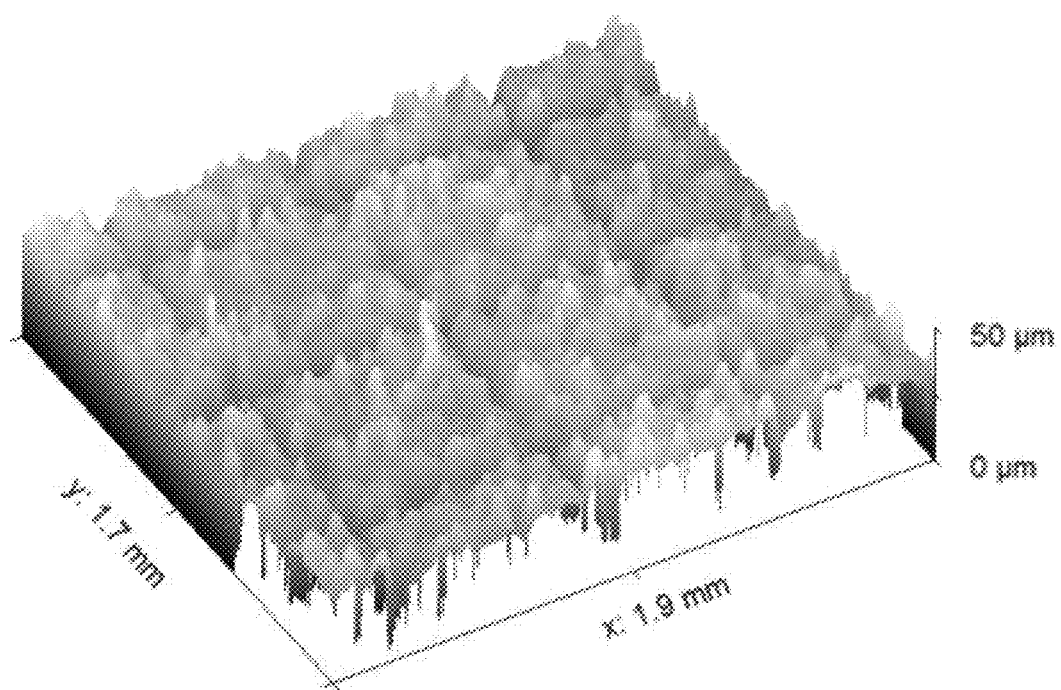
FIG. 4b shows an image of the exposed surface of the adhesive article according to Example 2 obtained with a confocal 3D laser scanning microscope.

FIG. 4b relates to the corresponding image of the surface of the adhesive layer of Example 2 after removal of the release liner. A network of channels derived from the ridges of the release liner can be clearly seen. Furthermore, the surface of the adhesive layer has numerous peaks of pressure-sensitive adhesive protruding from the adhesive layer. These peaks form contact points when bringing the adhesive article into contact with the surface of an object.

Figure 5A:
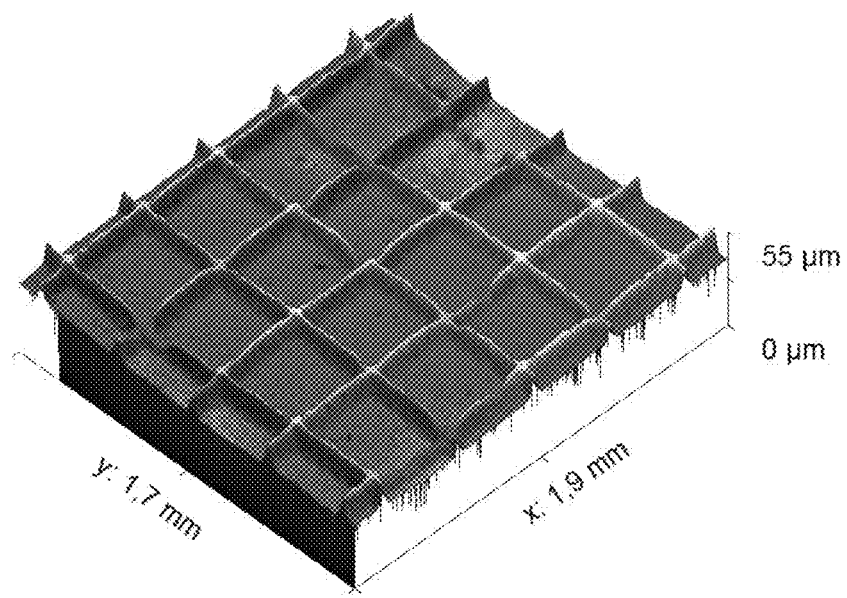
FIG. 5a shows an image of the surface of the release liner according to Comparative Example 1 obtained with a confocal 3D laser scanning microscope.
Figure 5B:
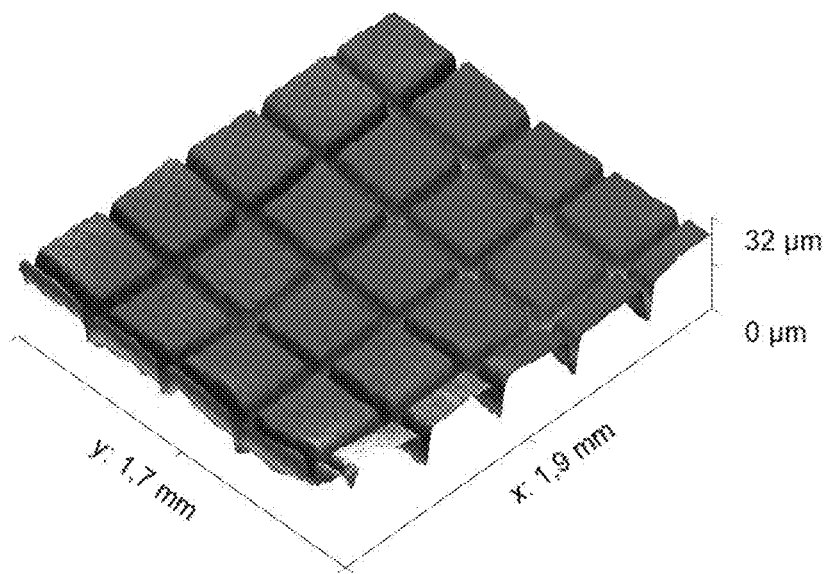
FIG. 5b shows an image of the exposed surface of the adhesive article according to Comparative Example 1 obtained with a confocal 3D laser scanning microscope.

In FIG. 5a, an image of the surface of the release liner of Comparative Example 1 is shown. The image was obtained using confocal 3D laser scanning microscope. The surface between the ridges is flat and smooth, because the chill roll has not been roughened. Thus, as can be seen in FIG. 5b, the surface of the exposed adhesive layer shows a network of channels. The surface of the adhesive layer between the channels is flat and smooth, so that basically the entire areas between the channels are available for forming the initial contact to the surface of an object, to which the adhesive article is applied.

The invention claimed is:

1. A release liner comprising:
  a carrier substrate;
  a thermoplastic polymer layer applied on one side of the carrier substrate; and
  a release layer applied on the thermoplastic polymer layer on the side opposite to the carrier substrate;
  wherein the thermoplastic polymer layer and the release layer include a network of ridges which result in elevations of the surface of the release liner on the side of the release layer;
  wherein the surface on the side of the release layer has a roughness at least between the ridges, such that it has a plurality of pits,
  wherein the average number of pits per an area of 3.4 mm$^2$ of the plan view of the release liner surface is at least 50 as determined with a confocal 3D laser scanning microscope at a magnification of 100, wherein only pits are counted, which extend at least to a level of 10.0 µm above the deepest point of the deepest pit within said area of 3.4 mm$^2$, and with the proviso that pits having a joint cross-sectional area in the plan view of the release liner surface at the level of 10.0 µm above the deepest point of the deepest pit are counted as a single pit, and
  wherein the pits are stochastically distributed at least between the ridges on the surface of the release liner.

2. The release liner according to claim 1, wherein the average number of pits per 3.4 mm$^2$ of the plan view of the release liner surface is at least 70.

3. The release liner according to claim 2, wherein, in the plan view of the release liner surface, the average cross-sectional area per pit at the level of 10.0 µm above the deepest point of the deepest pit is 15,000 µm$^2$ or less.

4. The release liner according to claim 1, wherein, in the plan view of the release liner surface, the average cross-sectional area per pit at the level of 10.0 µm above the deepest point of the deepest pit is 15,000 µm$^2$ or less.

5. The release liner according to claim 4, wherein, in the plan view of the release liner surface, the average cross-sectional area per pit at the level of 10.0 µm above the deepest point of the deepest pit is in the range of 300 to 10,000 µm$^2$.

6. The release liner according to claim 1, wherein the cross-sectional areas of the pits at the level of 10.0 µm above the deepest point of the deepest pit amount in total to 2 to 40% of the area in the plan view of the release liner surface.

7. The release liner according to claim 1, wherein the surface on the side of the release layer has between the ridges a roughness Ra of at least 0.9 µm as determined with a confocal 3D laser scanning microscope at a magnification of 100.

8. The release liner according to claim 1, wherein the surface on the side of the release layer has a roughness Ra at the ridges of at least 0.9 µm as determined with a confocal 3D laser scanning microscope at a magnification of 100.

9. The release liner according to claim 1, wherein the thermoplastic polymer layer comprises at least one of polyethylene and polypropylene, and the thermoplastic polymer layer has a basis weight of 10 to 60 g/m$^2$.

10. The release liner according to claim 1, wherein the release layer comprises a silicone, and the release layer has a basis weight of 0.1 to 3.0 g/m$^2$.

11. An adhesive article comprising:
  an article, optionally containing a coloring agent and/or having one or more of a grapheme and an image;
  an adhesive layer of a pressure-sensitive adhesive material arranged on the article; and
  the release liner according to claim 1, arranged on the adhesive layer,
  wherein the release layer of the release liner is in contact with the adhesive layer and the network of ridges of the surface of the release liner forms a network of channels in the adhesive layer, and the pits in the surface of the release liner form peaks in the adhesive layer.

12. The adhesive article according to claim 11, wherein the article is a polymer-based film, and/or
  the adhesive layer comprises an acrylic polymer.

13. The adhesive article according to claim 12, wherein the polymer-based film is a PVC-based film.

14. The release liner according to claim 1, wherein the average number of pits per 3.4 mm$^2$ of the plan view of the release liner surface is in the range of 70 to 500.

15. The release liner according to claim 1, wherein the average number of pits per 3.4 mm$^2$ of the plan view of the release liner surface is in the range of 140 to 400.

16. A process for decorating an object with an article, the process comprising the steps of:
  (A) providing an object;
  (B) providing the adhesive article according to claim 11;
  (C) removing the release liner from the adhesive article to expose the adhesive layer; and
  (D) bringing the exposed adhesive layer into contact with a surface of the object, optionally repositioning or sliding the article, and pressing the article against the object to obtain the object decorated with the article.

17. A process for decorating an object with an article, the process comprising the steps of:
  (A) providing an object;
  (B) providing the adhesive article according to claim 11 or 12;
  (C) removing the release liner from the adhesive article to expose the adhesive layer; and
  (D) bringing the exposed adhesive layer into contact with a surface of the object, optionally repositioning or sliding the article, and pressing the article against the object to obtain the object decorated with the article.

18. A process for producing the release liner according to claim 1, the process comprising the steps of:
  (a) providing a roll;
  (b) forming a network of channels into a surface of the roll and roughening the surface of the roll to produce a plurality of peaks in the surface, wherein the roughening is performed either before or after the formation of the network of channels, such that the surface of the roll resulting from step (b) is roughened at least between the channels and contains the plurality of peaks in the surface;
  (c) providing a composite comprising:
    the carrier substrate,
    the thermoplastic polymer layer applied on one side of the carrier substrate, and
    the release layer applied on the thermoplastic polymer layer on the side opposite to the carrier substrate; and
  (d) embossing the thermoplastic polymer layer and the release layer with the roll obtained in step (b) to form the network of ridges which result in elevations of the surface of the release liner on the side of the release layer and to roughen said surface of the release liner at least between the ridges resulting in the plurality of pits as defined in claim 1.

19. The process according to claim 18, wherein, in step (b), the surface of the roll is roughened using a jet of blasting material.

20. A process for producing the release liner according to claim 1, the process comprising the steps of:
(a) providing a roll;
(b) forming a network of channels into a surface of the roll and roughening the surface of the roll to produce a plurality of peaks in the surface, wherein the roughening is performed either before or after the formation of the network of channels, such that the surface of the roll resulting from step (b) is roughened at least between the channels and contains a plurality of peaks;
(c) providing a composite comprising:
the carrier substrate, and
the thermoplastic polymer layer being applied on one side of the carrier substrate;
(d) embossing the thermoplastic polymer layer with the roll obtained in step (b) in order to form the network of ridges and to roughen the surface of the thermoplastic polymer layer on the side opposite to the carrier substrate at least between the ridges resulting in the plurality of pits; and
(e) applying the release layer on the thermoplastic polymer layer obtained in step (d) on the side opposite to the carrier substrate to obtain the release liner,
wherein, in the release liner resulting from step (e), the thermoplastic polymer layer and the release layer include the network of ridges which result in the elevations of the surface of the release liner on the side of the release layer, and the surface on the side of the release layer is roughened at least between the ridges, such that it has the plurality of pits as defined in claim 1.

21. The process according to claim 20, wherein, in step (b), the surface of the roll is roughened using a jet of blasting material.

* * * * *